Oct. 16, 1934.   C. G. NAYLOR   1,976,797
PIPE COUPLING AND A METHOD OF PRODUCING THE SAME
Filed April 20, 1931   2 Sheets-Sheet 1
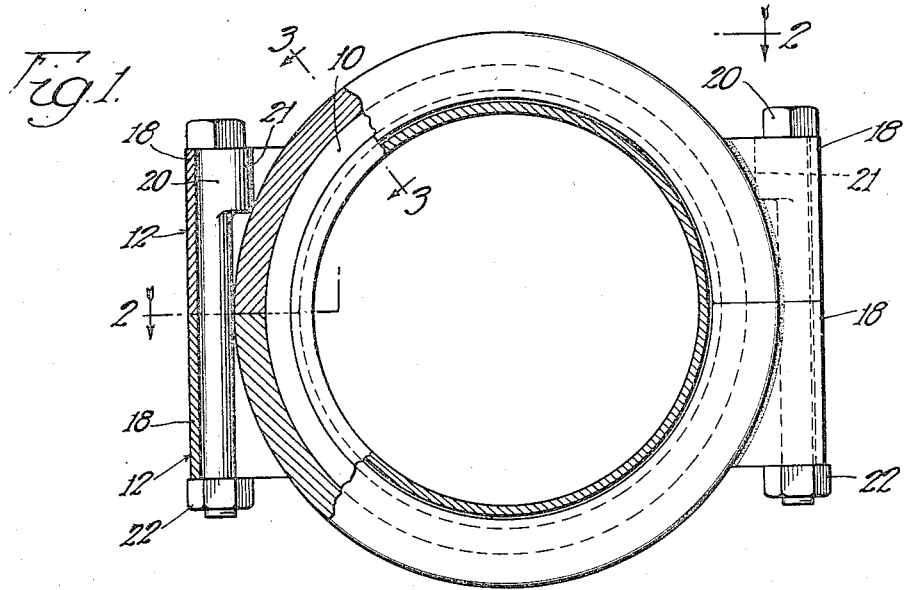
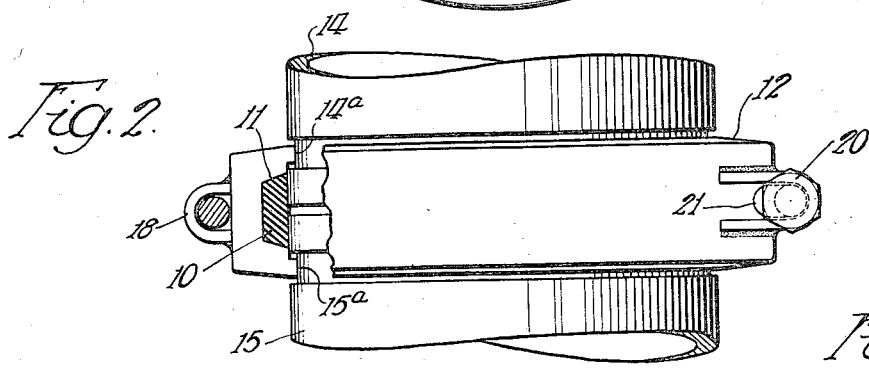
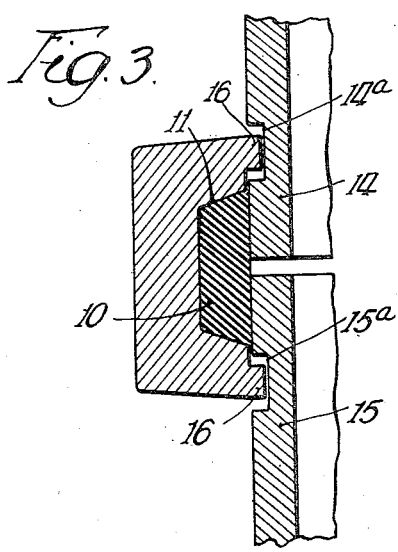
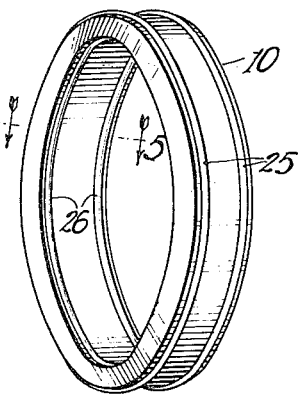
Inventor
Carl G. Naylor

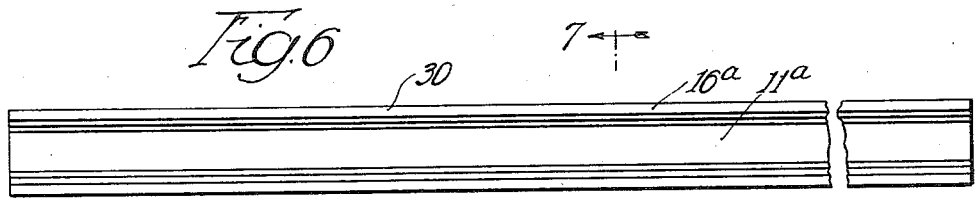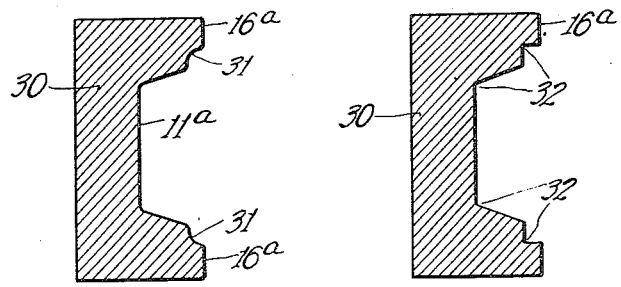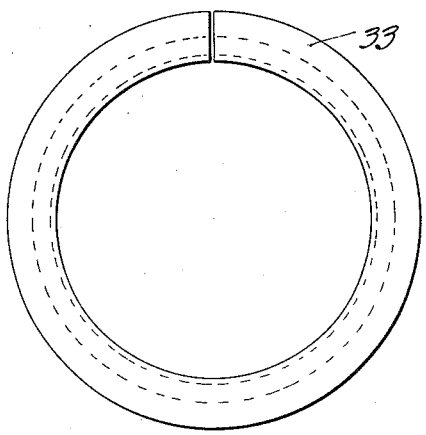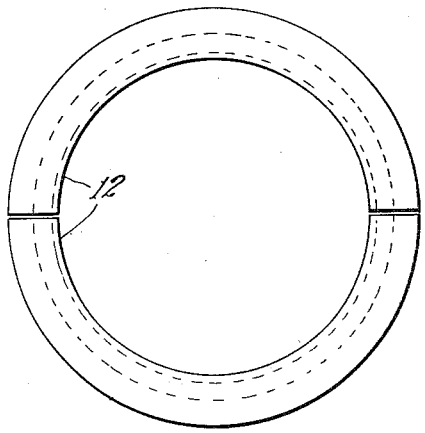

Patented Oct. 16, 1934

1,976,797

UNITED STATES PATENT OFFICE 1,976,797

PIPE COUPLING AND A METHOD OF PRODUCING THE SAME

Carl G. Naylor, Chicago, Ill., assignor to Naylor Pipe Company, Chicago, Ill., a corporation of Illinois Application April 20, 1931, Serial No. 531,546

3 Claims. (Cl. 285—194)

The invention relates to pipe couplings and a method of producing them, and has, among its other objects, the provision of an improved pipe coupling of the type wherein an annular resilient gasket is compressed around the abutting ends of two tubes or pipes to seal the joint thus formed.

One form of the invention is embodied in an improved coupling device of the character described wherein an annular gasket of resilient or compressible material is provided with projecting annular ribs which are driven into the body portion of the gasket when it is compressed around the pipe, the ribs being driven into the body portion in this manner to form highly compressed portions of the gasket which effectively seal the joints between the two tubes or pipes. An advantage of this construction is that coupling members adapted to be clamped around the improved gasket to compress it are more readily assembled with the gasket and pipe than they would be if the entire gasket were to be compressed to the same extent that the rib portions are compressed in the improved gasket. The clamping members are preferably formed from rolled metal shapes or bars which are cut into predetermined lengths and are then formed into arcuate members adapted to fit snugly around the gaskets. Lugs welded on the clamping members provide means whereby the clamping members may be secured to each other with bolts, or the equivalent.

Other objects and advantages of the invention will become apparent as the following detailed description progresses, reference being had to the accompanying drawings, wherein:

Figure 1 is an elevation, partly broken away, of a pipe coupling which embodies a preferred form of the invention;

Fig. 2 is a plan view of the coupling, the coupling being partly broken away along the line indicated at 2—2 in Fig. 1;

Fig. 3 is an enlarged section taken on line 3—3 of Fig. 1;

Fig. 4 is a perspective view of a gasket which embodies a preferred form of the invention;

Fig. 5 is a section taken on line 5—5 of Fig. 4;

Fig. 6 is a plan view of a rolled metal shape or bar from which the clamping members of my improved pipe coupling are preferably formed;

Fig. 7 is an enlarged section taken on line 7—7 of Fig. 6;

Fig. 8 is a section taken on the same line as Fig. 7 after the bar has been machined to remove excess material left thereon during the rolling operation;

Fig. 9 is a side elevation of the bar when it is formed into an annulus to produce the arcuate clamping members which form part of the improved pipe coupling, and Fig. 10 illustrates how the bar may be formed into a plurality of arcuate members which may be assembled to form the annulus adapted to clamp the gasket to the pipe.

Referring for the present to Figs. 1 to 5, inclusive, wherein a preferred form of the invention is illustrated, the reference character 10 designates generally a gasket which is preferably formed from compressible or resilient material such as rubber, or the equivalent. The gasket 10 is annular in form and is adapted to seat or to fit snugly in an annular recess 11 formed in a pair of metallic coupling members 12 which are preferably identical in form.

As best shown in Figs. 2 and 3, the gasket 10 is adapted to encircle the opposing ends of two pipes 14 and 15 so that it seals the joints between the pipes. The pipes 14 and 15 are provided with annular grooves 14a and 15a, respectively, in their outer cylindrical surfaces, which grooves 14a and 15a receive arcuate flanges 16 provided upon the clamping members 12. In the preferred embodiment of the invention, clearance is provided in the grooves 14a and 15a so that the pipes 14 and 15 may expand and contract when subjected to changes in temperature, the construction being preferably such that the arcuate flanges 16 do not abut against the side walls of the grooves which receive them.

Each of the clamping members 12 is provided with a pair of lugs 18, each of the lugs 18 preferably comprising a U-shaped member formed from a bar of iron, or the equivalent. Bolts 20 extending through the lugs 18 are adapted to secure the clamping members 12 to each other in such manner that the gasket 10 is compressed in a manner described below. Each bolt 20 is preferably provided with a laterally extending lug 21 which prevents the bolt from turning in the lugs 18 and facilitate the task of tightening nuts 22 with which the bolts are provided.

As best shown in Figs. 4 and 5, the gasket 10 is preferably formed with substantially cylindrical inner and outer surfaces, the end surfaces of the gasket being preferably inclined so that the gasket tapers down from its inner cylindrical surface to its outer cylindrical surface. Formed on the outer and inner surfaces of the gasket 10 are integral projecting ribs 25 and 26, respectively, which are adapted to be driven into the body portion of the gasket when the clamping members 12 are assembled with the gasket in the manner illustrated in Figs. 1 to 3, inclusive. When the ribs 25 and 26 are driven into the body portion of the gasket they form highly compressed portions of the gasket and it is readily understood that they effectively seal the joint between the coupled pipes.

With respect to the embodiment of the invention illustrated in Figs. 4 and 5, it is obvious that there will be a highly compressed annular portion in the gasket extending between the ribs 25 and 26 at one end thereof and another highly compressed annular portion between the ribs 25 and 26 at the other end thereof. As shown, the ribs 26 are preferably spaced longitudinally with respect to the ribs 25 and the ribs 25 and 26 are preferably spaced from the ends of the gasket.

As explained above, an important advantage attending the use of the improved gasket is that the clamping members 12 and 13 are easily assembled therewith. Thus, the body portion of the gasket is preferably of such dimensions that if the ribs 25 and 26 were omitted, the gasket would fit snugly within the annular recess 11 but would not be compressed when the clamping members 12 were secured in place around it. Therefore, it is a relatively easy matter to drive the ribs 25 and 26 into the body of the gasket. However, if the entire gasket were to be compressed to the same extent that the portions lying between the portions 25 and 26 are compressed, considerable difficulty would be met in forcing the clamping members 12 into their assembled positions as the gasket then tends to buckle between the clamping members while they are being forced into their functional positions.

As set forth above, the gasket 10 is preferably formed from a resilient material, or a compressible material. In the embodiment of the invention illustrated in the drawings, the gasket is made from rubber, or the equivalent. It is contemplated, however, that in some instances it may be preferable to employ gaskets fabricated from fibrous material and tin-foil, or the equivalent, or any other gasket which may be compressed but is not as resilient as a rubber gasket.

Referring now to Figs. 6 to 10, inclusive, wherein I have illustrated the preferred method of producing the clamping members 12, the reference character 30 designates a bar or shape which is preferably rolled from iron, or the equivalent. As best shown in Figs. 6 and 8, the bar is in the form of a channel to provide a groove 11a which subsequently forms the recess 11 in the clamping members 12. Flanges 16a formed upon the bar 30 subsequently form the flanges 16 upon the clamping members 12. It will be noted that fillets 31 of metal are left on the bar between the flanges 16a and the groove 11a. These fillets 31 are removed in a subsequent machine operation so that substantially sharp corners are left in place thereof, as indicated at 32 in Fig. 8.

After the bar 30 has been machined to remove the fillets 31, it is cut into predetermined lengths and these lengths are preferably formed into rings 33, one of which is shown in Fig. 9. The rings 33 are formed by first roughly swedging them into the desired diameter, after which they are placed in apparatus (not shown) which subjects them to relatively high pressures and forms them into accurate circles. It will be noted that the ends of each bar are brought into substantially abutting relation. The ring 33 is then cut through at a point diametrically opposite the joint formed by the ends of the bar, after which the lugs 18 are welded to the two halves thus formed.

Instead of machining the fillets 31 from the bar 30 before the bar is cut into predetermined lengths, the machining may be done after the bar sections have been partially formed into circles.

In Fig. 10, a modified form of the invention is illustrated. In this instance, the bar is cut into shorter predetermined lengths, and each bar section is bent into a semi-circle, as illustrated, so that the two clamping members 12 are formed directly without necessitating the operating of cutting through a ring 33.

Generally, it will not be necessary to machine any part of the rolled bar 30 except to remove metal left in corners, etc., during the rolling operating. It is contemplated that when the clamping members 12 are formed by practicing the method which is illustrated in Fig. 10 the excess metal in the corners, etc., may be removed after the bar sections have been shaped into semi-circles. In some of the larger sizes, it may be preferable to form the metallic members of the coupling devices in three or more arcuate sections to facilitate the task of assembling them with the gaskets.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I claim as new, and desire to secure by Letters Patent, is:

1. A device for coupling pipes, which device comprises a split clamping member having an annular recess in its inner surface, an annular gasket disposed in said recess, said gasket comprising a solid body portion substantially filling said recess and disposed around the adjacent ends of the pipes to be coupled, and beads formed integral with said body portion on the inner and outer surfaces thereof, and means causing said split clamping member to hold said beads compressed into the body portion when said clamping member is functionally operative.

2. A device for coupling pipes, which device comprises a split clamping member having an annular recess in its inner surface, an annular gasket disposed in said recess, said gasket comprising a solid body portion substantially filling said recess and disposed around the adjacent ends of the pipe to be coupled, and beads formed integral with said body portion and compressed into said body portion when said clamping member is in its functionally operative position, and means for contracting said split clamping member.

3. A device for coupling pipes, which device comprises a split clamping member having an annular recess in its inner surface, an annular gasket disposed in said recess, said gasket comprising a solid body portion substantially filling said recess, and disposed about the end of a pipe to be coupled, and beads formed integral with said body portion on the inner and outer surfaces thereof, and means causing said split clamping member to hold said beads compressed into the body portion when said clamping member is functionally operated.

CARL G. NAYLOR.